(12) United States Patent
Uchida

(10) Patent No.: US 7,246,243 B2
(45) Date of Patent: Jul. 17, 2007

(54) IDENTIFICATION SYSTEM AND METHOD FOR AUTHENTICATING USER TRANSACTION REQUESTS FROM END TERMINALS

(75) Inventor: Kaoru Uchida, Tokyo (JP)

(73) Assignee: NEC Corporation, Tokyo (JP)

( * ) Notice: Subject to any disclaimer, the term of this patent is extended or adjusted under 35 U.S.C. 154(b) by 1146 days.

(21) Appl. No.: 09/854,666

(22) Filed: May 15, 2001

(65) Prior Publication Data

US 2001/0044900 A1 Nov. 22, 2001

(30) Foreign Application Priority Data

May 16, 2000 (JP) ............................. 2000-142617

(51) Int. Cl.
*G06K 9/00* (2006.01)
(52) U.S. Cl. ............................... 713/186; 726/2; 726/3
(58) Field of Classification Search ................ 713/170, 713/186; 382/115; 726/2, 3
See application file for complete search history.

(56) References Cited

U.S. PATENT DOCUMENTS

| | | | | |
|---|---|---|---|---|
| 5,613,012 A | * | 3/1997 | Hoffman et al. | ............ 382/115 |
| 6,202,151 B1 | * | 3/2001 | Musgrave et al. | .......... 713/186 |
| 6,320,974 B1 | * | 11/2001 | Glaze et al. | ................ 382/115 |
| 6,332,193 B1 | * | 12/2001 | Glass et al. | ................. 713/170 |
| 6,697,947 B1 | * | 2/2004 | Matyas et al. | .............. 713/182 |

FOREIGN PATENT DOCUMENTS

| | | | |
|---|---|---|---|
| JP | 5-347617 | A | 12/1993 |
| JP | 10-117173 | A | 5/1998 |
| JP | 11-73569 | A | 3/1999 |
| JP | 11-96363 | | 4/1999 |
| JP | 11-98252 | A | 4/1999 |
| JP | 11-338947 | * | 10/1999 |
| JP | 11-339045 | A | 12/1999 |
| JP | 2000-92046 | A | 3/2000 |
| JP | 2002-501700 | A | 5/2002 |

* cited by examiner

*Primary Examiner*—Kambiz Zand
*Assistant Examiner*—Ellen C. Tran
(74) *Attorney, Agent, or Firm*—Sughrue Mion, PLLC

(57) ABSTRACT

In an identification system for electronic commerce, an end terminal transmits a transaction request message containing biometrics data of a user to a communications network, At least one electronic commerce service provider unit is provided which receives the transaction request message via the network and transmits an authentication request message containing the biometrics data to the network. An authentication server having a database for storing registered biometrics data receives the authentication request message and determines whether the received biometrics data has corresponding biometrics data in the database and returns a reply to the ECSP unit via the network indicating that the transaction request message is authenticated if the received biometrics data coincides with one of the registered biometrics data of the database.

26 Claims, 13 Drawing Sheets

USER TERMINAL

USER TERMINAL

IDENTIFICATION SYSTEM AND METHOD FOR AUTHENTICATING USER TRANSACTION REQUESTS FROM END TERMINALS

BACKGROUND OF THE INVENTION

1. Field of the Invention

The present invention relates generally to electronic commerce over communications networks and more specifically to an identification system and method for identification of end-terminal consumers using their biometric features for authorization of transactions.

2. Description of the Related Art

As electronic commerce expands, transactions over communications networks became a target for fraudulent and criminal conducts which are becoming more organized and more technically adept. In order to combat the illegal attempts, customers' biometrics data such as fingerprints are becoming used as a reliable means for personal identification. Pat. No. 5,613,012, when a customer requests a transaction over a network to an electronic commerce service provider, he sends a biometrics feature such as his fingerprint to the service provider, where it is compared with the registered fingerprint. If they match, the service provider authenticates the transaction and proceeds to provide an electronic commerce service to the customer and enters a settlement process with an associated banking facility. However, if the customer wishes to receive service from more than one electronic commerce service provider, there is a need to register the customer's biometrics data in as many service providers as there are necessary to meet the customer's desire. In addition, if the EC service providers are equipped with a technically low-level system or manned by people who are poorly trained in biometrics data security matters, fraudulent leakage of important personal data will occur at a high rate.

SUMMARY OF THE INVENTION

It is therefore a primary object of the present invention to provide a user identification system and method that eliminates the need to make a registration for each electronic commerce service provider.

Another object of the present invention is to provide a user identification system and method that is secure against potential danger of eavesdropping by the electronic commerce service providers.

The stated primary object is attained by the provision of a single authenticator in which biometrics data of consumers are registered in a database and to which a plurality of electronic commerce service providers are connected via a communications network. Consumers send a transaction request messages containing their biometrics data to a desired EC service provider, which requests authorization from the user authenticator. If the transmitted biometrics data has a corresponding biometrics data in the database, the user authenticator responds to the authentication request with a reply indicating authentication of the transaction.

According to a first aspect, the present invention provides an identification system comprising a plurality of end terminals, each of the end terminals transmitting a transaction request message containing biometrics data of a user and a user identifier of the user to a communications network, at least one electronic commerce service provider unit for receiving the transaction request message via the network and transmitting an authentication request message containing the biometrics data and the user identifier to the network, and an authentication server having a database for mapping a plurality of registered biometrics data to a plurality of corresponding registered user identifiers, the authentication server receiving the authentication request message via the network, comparing the received biometrics data to one of the registered biometrics data which is mapped in the database to the user identifier contained in the authentication request message and returning a reply to the ECSP unit via the network indicating that the transaction request message is authenticated if the received biometrics data coincides with the mapped biometrics data.

According to a second aspect, the present invention provides an identification system comprising a plurality of end terminals respectively identified by user identifiers, each of the end terminal transmitting a transaction request message containing biometrics data of a user to a communications network, at least one electronic commerce service provider unit for receiving the transaction request message via the network and transmitting an authentication request message containing the biometrics data to the network, and an authentication server having a database for mapping a plurality of registered biometrics data to a plurality of corresponding registered user identifiers, the authentication server receiving the authentication request message via the network, comparing the received biometrics data to all of the registered biometrics data in the database, detecting the user identifier mapped to the biometrics data which coincides with the received biometrics data, and returning a reply to the ECSP unit via the network indicating that the user having the detected user identifier is authenticated.

The second object is achieved by having each of the end terminals cipher the biometrics data so that the biometrics data contained in the transaction request message and the authentication request message is the ciphered biometrics data, and having the authentication server decipher the ciphered biometrics data contained in the received authentication request message.

According to a third aspect, the present invention provides an identification method comprising the steps of (a) transmitting, from an end terminal a transaction request message containing biometrics data of a user to a communications network, (b) receiving, at an electronic commerce service provider the transaction request message via the network, (c) transmitting from the electronic commerce service provider, an authentication request message containing the biometrics data to the network, (d) receiving the authentication request message via the network at a user authenticator having a database for storing a plurality of registered biometrics data, (e) determining whether the received biometrics data has corresponding biometrics data in the database, and (f) returning a reply from the user authenticator to the electronic commerce service provider via the network indicating that the transaction request message is authenticated if the received biometrics data coincides with one of the registered biometrics data of the database.

According to a fourth aspect, the present invention provides an identification method comprising the steps of (a) transmitting, from an end terminal, a transaction request message containing biometrics data of a user and a user identifier of the user to a communications network, (b) receiving, at an electronic commerce service provider, the transaction request message via the network, (c) transmitting, from the electronic commerce service provider, an authentication request message containing the biometrics data and the user identifier to the network, (d) receiving the authentication request message at a user authenticator via the network, the authenticator having a database in which a plurality of registered biometrics data are mapped to a plurality of corresponding registered user identifiers, (e) comparing the received biometrics data to one of the registered biometrics data which is mapped in the database to the user identifier contained in the authentication request message, and (f) returning, from the user authenticator, a reply to the electronic commerce service provider via the network indicating that the transaction request message is authenticated if the received biometrics data coincides with the mapped biometrics data.

BRIEF DESCRIPTION OF THE DRAWINGS

The present invention will be described in detail further with reference to the following drawings, in which.

DETAILED DESCRIPTION

Figure 1:
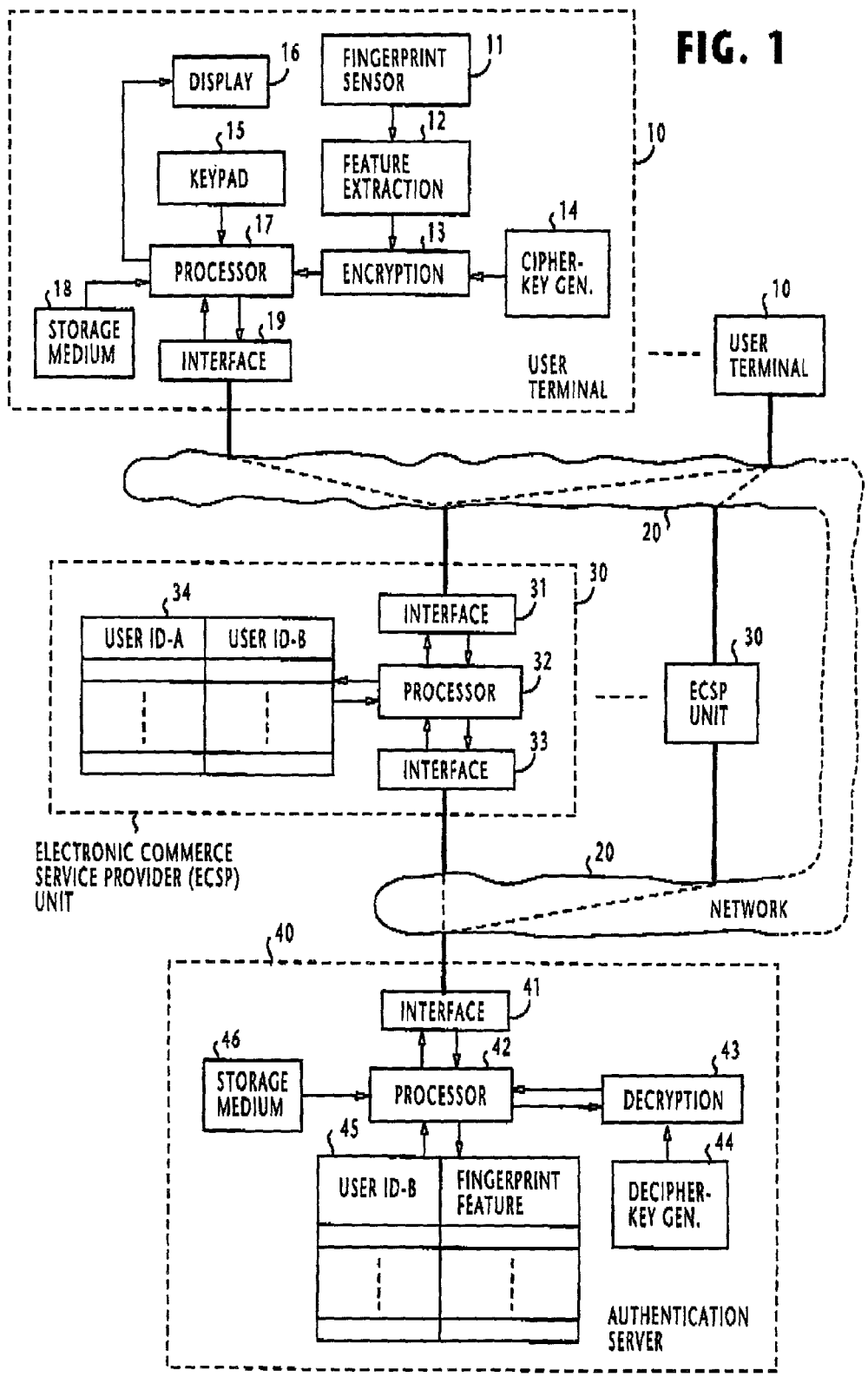
FIG. 1 is a block diagram of an identification system according to a first embodiment of the present invention.

Referring now to FIG. 1, there is shown an identification system for authenticating personal biometrics data according to a first embodiment of the present invention. The system is comprised of a plurality of user terminals 10 and a plurality of electronic commerce service provider (ECSP) units 30 to which the user terminals 10 are selectively connected via a communications network 20. ECSP units 30 are connected via the network 20 to an authentication server 40 to request authorization of transaction requests received from the user terminals. Authentication server 40 is established and maintained by an organization independent of the EC service providers, if a transaction request is authenticated by the authentication server 40, the ECSP units proceed to provide their own commerce services using an electronic settlement process with associated banking facilities. Each user terminal 10 selects one of the ECSP units that meets the specific needs of the user.

Each user terminal 10 includes a fingerprint sensor 11, a fingerprint feature extraction unit 12 and an encryption unit 13. Encryption unit 13 may be implemented with the common key encryption scheme such as DES (Data Encryption Standard) or the public key encryption scheme such as RSA (Rivest, Shamir, Aleman). In the latter case, a public key corresponding to the decryption key of the authentication server is used for encryption.

A user's fingerprint is detected by the sensor 11 and a fingerprint feature such as ridge patterns is extracted by the feature extraction unit 12 and ciphered by the encryption unit 13 using a secret key generated by a cipher-key generator 14. A keypad 15 and a display panel 16 are connected to a processor 17 to which the encryption unit 13 is also connected. Processor 17 operates with the associated units according to a programmed instructions stored in a suitable storage medium 18 and exchanges packets with one of the ECSP unit 30 via a network interface 19. To provide a tamper-proof terminal, the fingerprint sensor 11, the feature extraction unit 12, the decryption unit 13 and the cipher-key generator 14 are all organized in an inseparable unit so that sensitive data is protected from an intruder.

Each of the user terminals 10 may be implemented in a desktop or notebook computer, personal digital assistant (PDA) or any other home appliances of the type provided with communication and data processing functions. Each user is uniquely identified by the system with an assigned user identifier (ID-A).

Each ECSP unit 30 is comprised of an interface 31 connected to the network 20 for receiving packets from the user terminals 10. The received user packets are processed in a processor 32 and forwarded through an interface 33 and via the network 20 to the authentication server 40. Processor 32 is further associated with an ID conversion table 34 in which the user identifiers ID-As from the user terminals 10 are mapped to corresponding user identifiers ID-Bs. The converted user identifiers ID-Bs are used exclusively for data transfer between the ECSP units and the authentication server 40. The use of user identifiers ID-B's different from ID-A's for data transfer between ECSP's and authentication server 40 prevents the latter from accessing the sensitive personal data of the registered users. Further, the use of ciphered user's biometric data for data transfer between the end terminals and the authentication server prevents the ECSP's from eavesdropping the sensitive biometrics data of the registered users.

Authentication server 40 is comprised of an interface 41 connected to the network 20 to exchange packets. Packets from the network 20 are processed in a processor 42 according to programmed instructions stored in a storage medium 46. The ciphered biometric data contained in a received packet is deciphered by a decryption unit 43 using a secret key supplied from a decipher-key generator 44. The deciphered biometric data (fingerprint features) and corresponding user identifiers (ID-Bs) are mapped in a user identification table 45.

Figure 2:
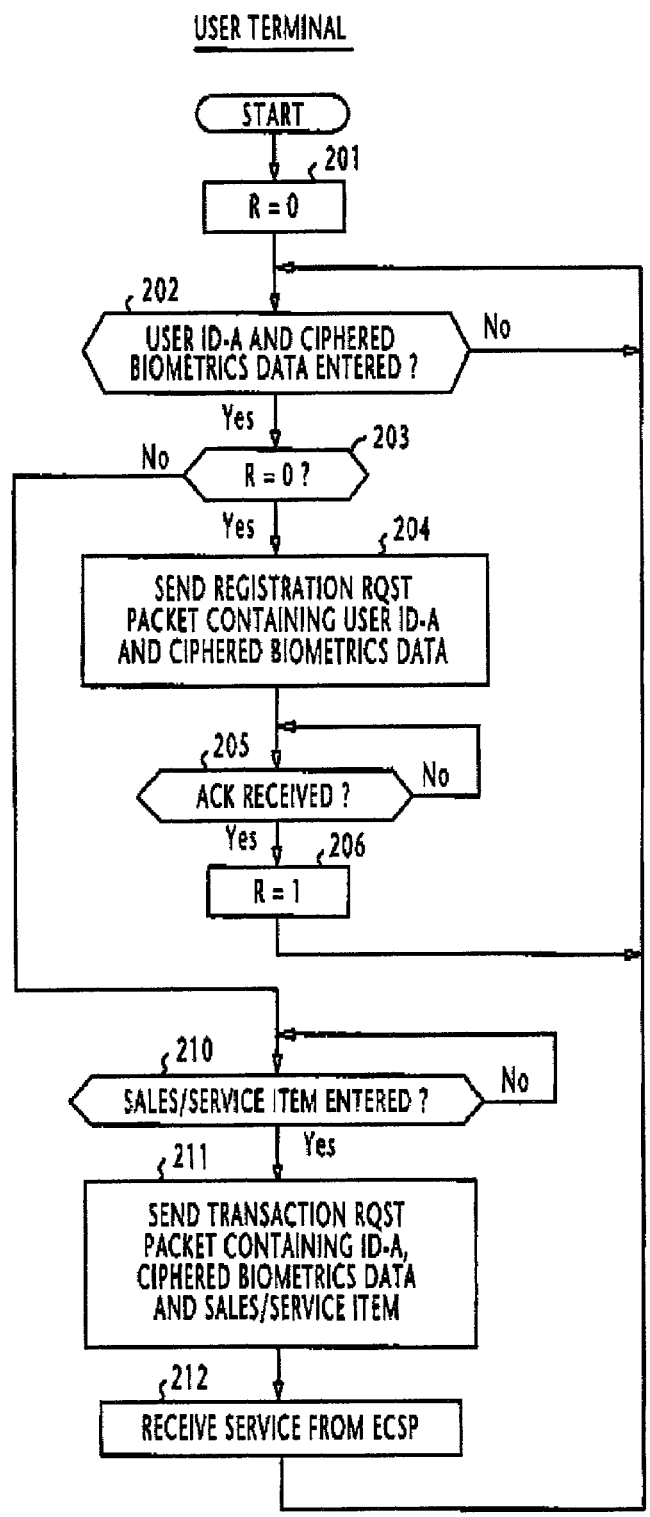
FIG. 2 is a flowchart of the operation of the user terminal of FIG. 1.
Figure 5:
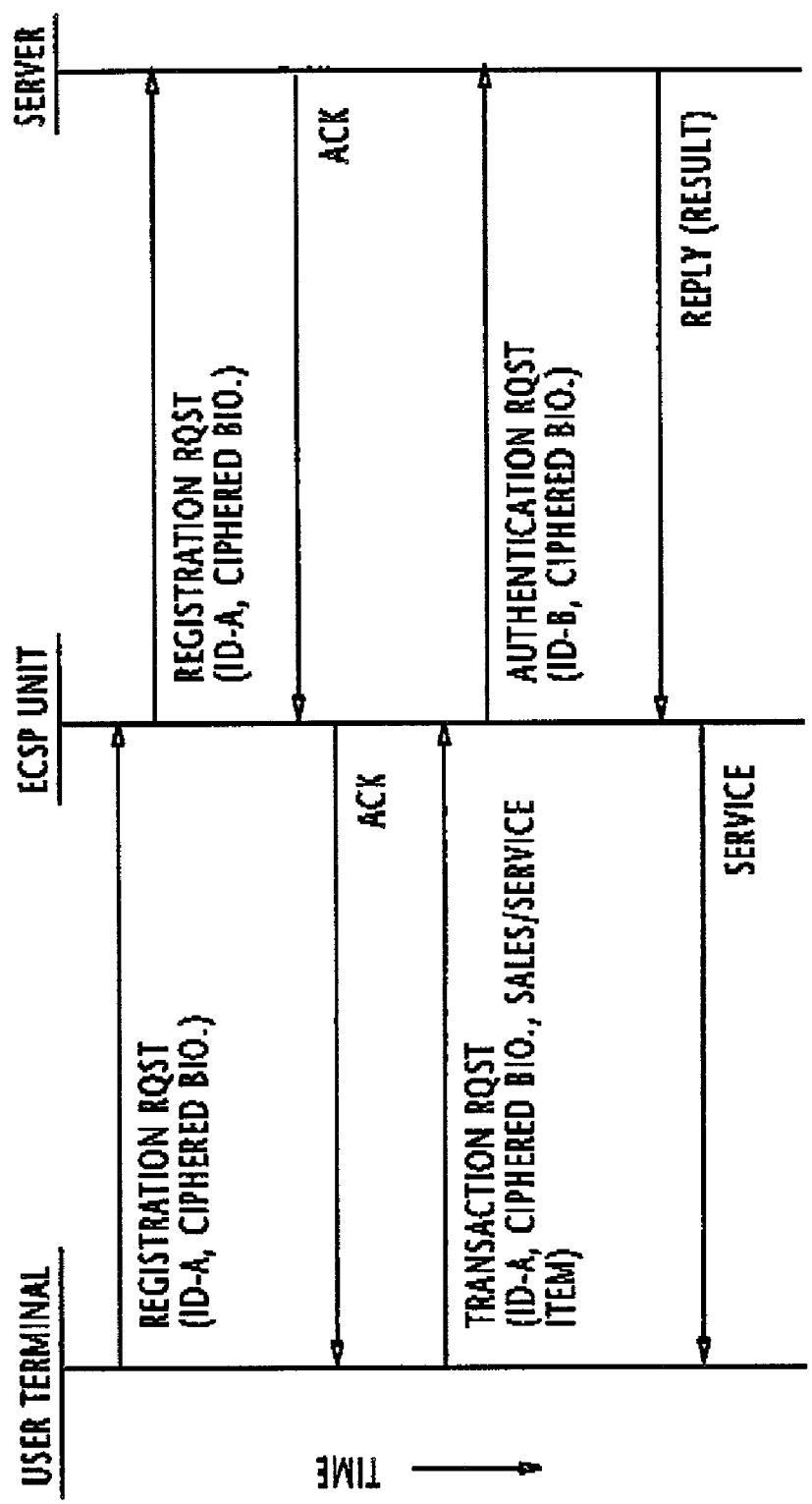
FIG. 5 is a sequence diagram of the operation of the system of FIG. 1.

The operation of processor 17 at the user terminal 10 proceeds according to the flowchart of FIG. 2 and the sequence diagram of FIG. 5.

At the start of the programmed routine, the processor 17 sets a registration flag R to 0 at step 201 and proceeds to step 202 to monitor the output of the encryption unit 13 to check to see if the user ID-A and ciphered biometrics data (fingerprint feature) are obtained. If so, the processor 17 checks the flag R to see if the user is already registered or not (step 203). If R=0, the processor determines that the user is not yet registered in the authentication server and proceeds to step 204 to transmit a registration request packet to a desired ECSP unit 30 through the network 20, containing the user ID-A and the ciphered biometrics data (see also FIG. 5). If the registration is successful at the authentication server 40, an acknowledgment packet will be returned and the processor 17 receives it at step 205 and sets the registration flag R to 1 (step 206), and returns to step 202.

When the user subsequently enters his user identifier ID-A and fingerprint, the processor determines, at step 203, that the user has been registered and proceeds to decision step 210 to check for the entry of sales/service item of electronic commerce through the keypad 15. If such an item has been entered by the user, the processor formulates a transaction request packet with the user ID-A, the ciphered biometrics data and the sales/service item and transmits the packet to the desired ECSP unit via the network 20. If the user is authenticated, the ECSP unit is notified accordingly from the authentication server 40 and the user receives appropriate service from the ECSP (step 212), and the processor returns to step 202.

Figure 3:
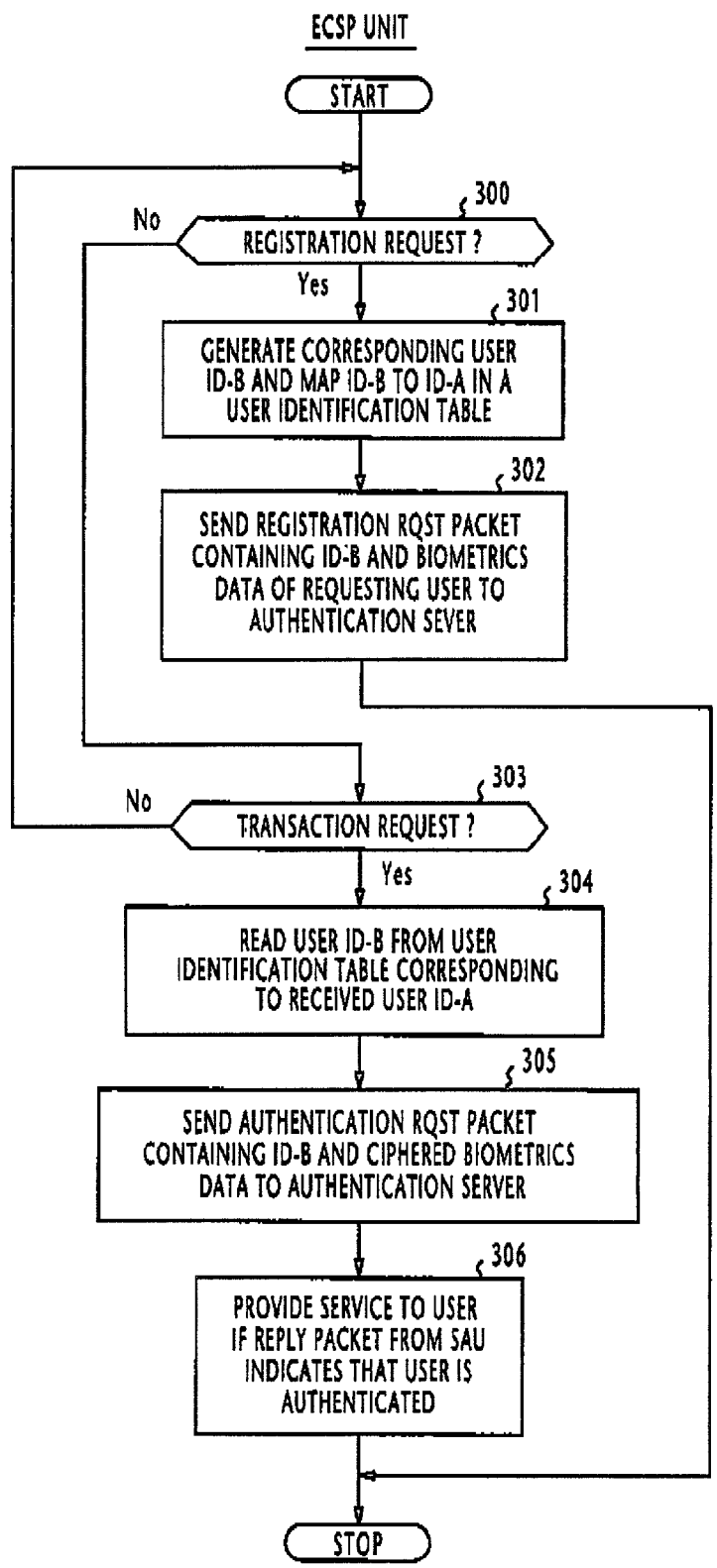
FIG. 3 is a flowchart of the operation of the electronic commerce service provider unit of FIG. 1.

In FIG. 3, when the ECSP unit 30 receives a registration request packet from a user terminal 10 at step 300, the processor 32 generates a user ID-B corresponding to the user ID-A contained in the packet and maps theses identifiers in the conversion table 34 (step 301) and sends a registration request packet to the authentication server 40 via the network 20, containing the user ID-B and the ciphered biometrics data (step 302).

When the ECSP unit 30 receives a transaction request packet (step 303), the processor 32 reads a user ID-B from the conversion table 34 that corresponds to the user ID-A contained in the transaction request packet (step 304) and transmits an authentication request packet to the authentication server 40, containing the ID-B and ciphered biometrics data of the requesting user (step 305). When the processor 32 receives a reply packet at step 306 from the SAU 40, the ECSP provides service of electronic commerce to the requesting user if the reply packet indicates that the user is identified as an authorized user.

Figure 4:
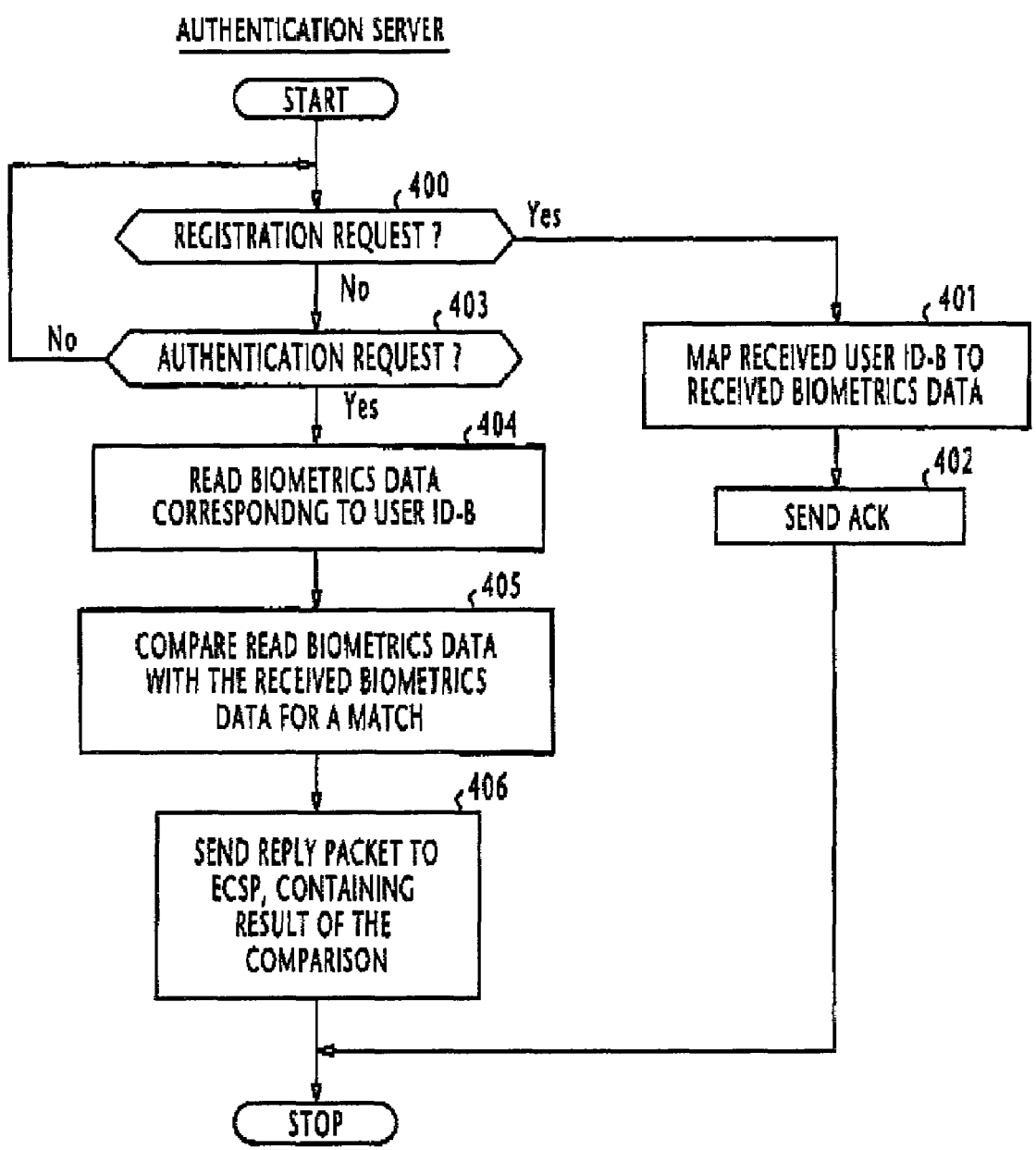
FIG. 4 is a flowchart of the operation of the authentication server of FIG. 1.

In FIG. 4, when the processor 42 at the SAU 40 receives a registration request packet hat contains a user ID-B and ciphered biometrics data from an ECSP unit 30 (step 400), the processor 42 proceeds to step 401 to cause the decryption unit 43 to decipher the biometrics data and maps the user ID-B to the deciphered biometrics data in the user identification table 45 and sends an acknowledgment packet indicating that the user is registered in the system (step 402). When the processor 42 receives an authentication request packet containing a user ID-B and ciphered biometrics data from the ECSP unit (step 403), biometrics data corresponding to the user ID-B contained in the packet is read from the user identification table 45 (step 404) and compared with the received biometrics data for coincidence (step 405). It they match, the processor 42 sends a reply packet to the requesting ECSP unit, indicating that that the requesting user is a registered user of the system (step 406).

Figure 6:
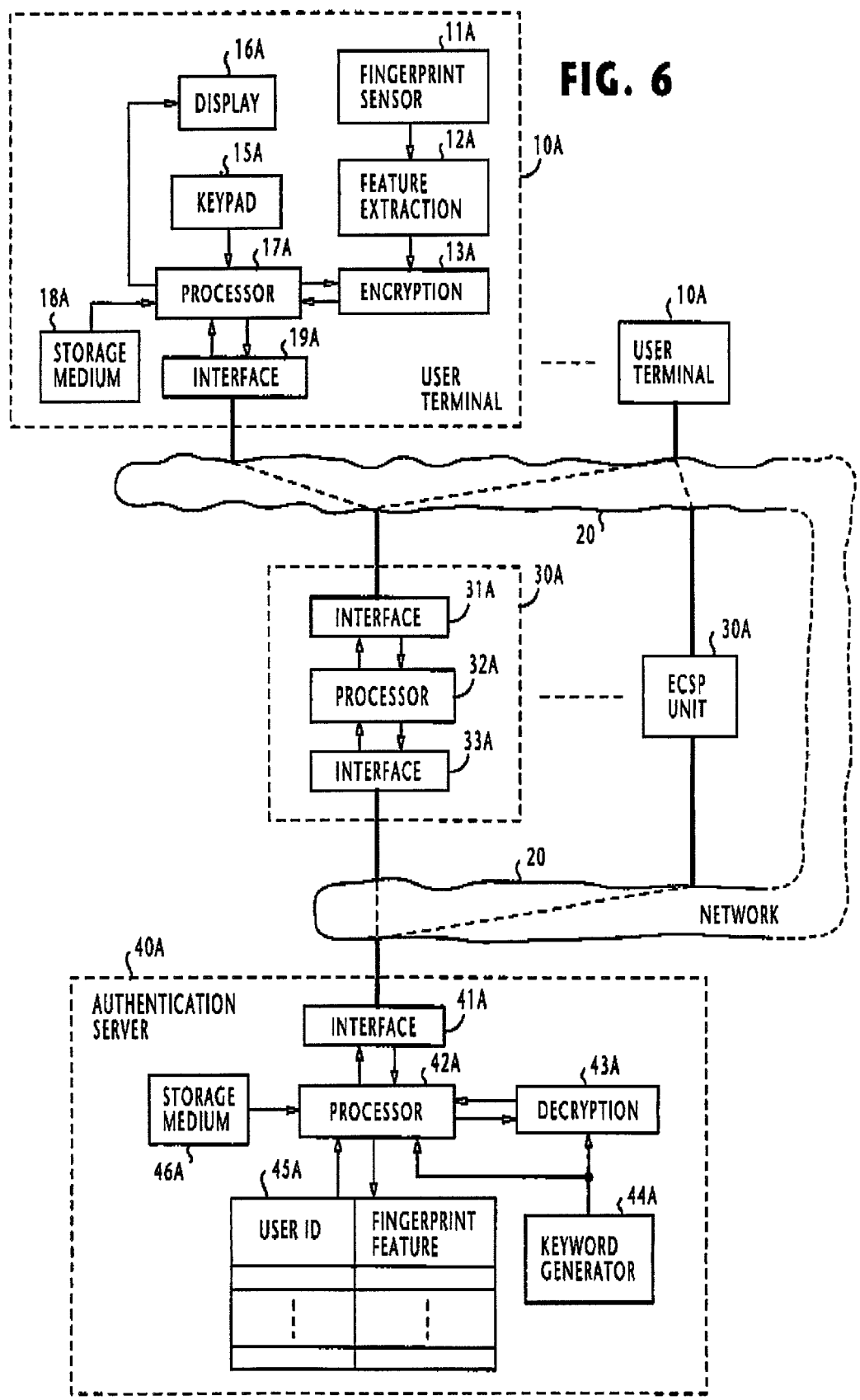
FIG. 6 is a block diagram of an identification system according to a second embodiment of the present invention.

The identification system according to a second embodiment of the present invention is shown in FIG. 6.

In the second embodiment, the user terminals 10 A differ from the user terminals of the previous embodiment in that the encryption unit 13A receives an encryption key from the processor 17A that is transmitted from the authentication server 40A for a data transfer during both registration and transaction modes. This increases the security of the secret key from illegal deciphering attempts. ECSP units 30A are not provided with the conversion table of the previous embodiment. Due to the enhanced security of the encryption/decryption key which varies with time, the user identifiers input at the user terminals are directly used for data transfer through the network 20. For this purpose, the authentication server 40A includes a secret key generator 44A which generates a different secret key at different times and supplies it to the processor 42A and the decryption unit 43A. User identification table 45A stores user identifiers ID instead of the converted user identifiers of the previous embodiment.

Figure 7:
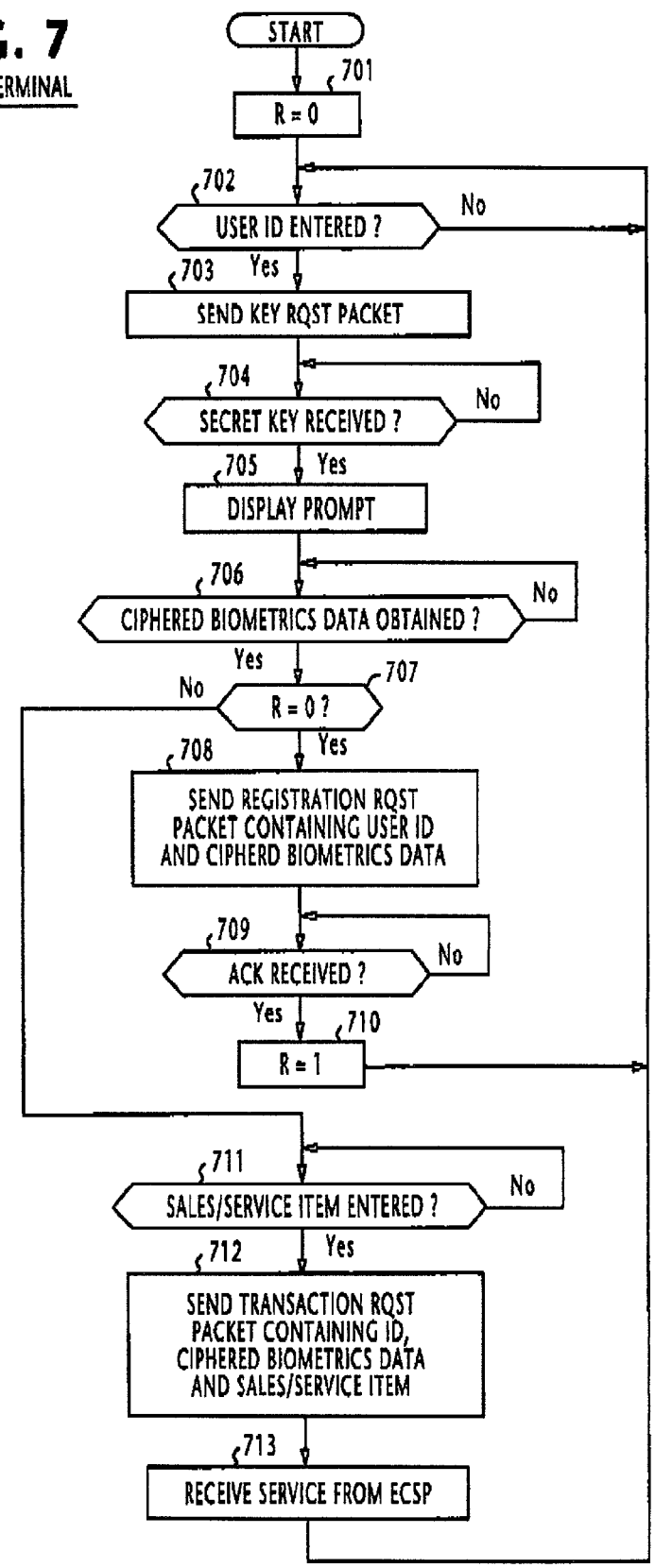
FIG. 7 is a flowchart of the first mode of operation of the user terminal of FIG. 6.
Figure 8:
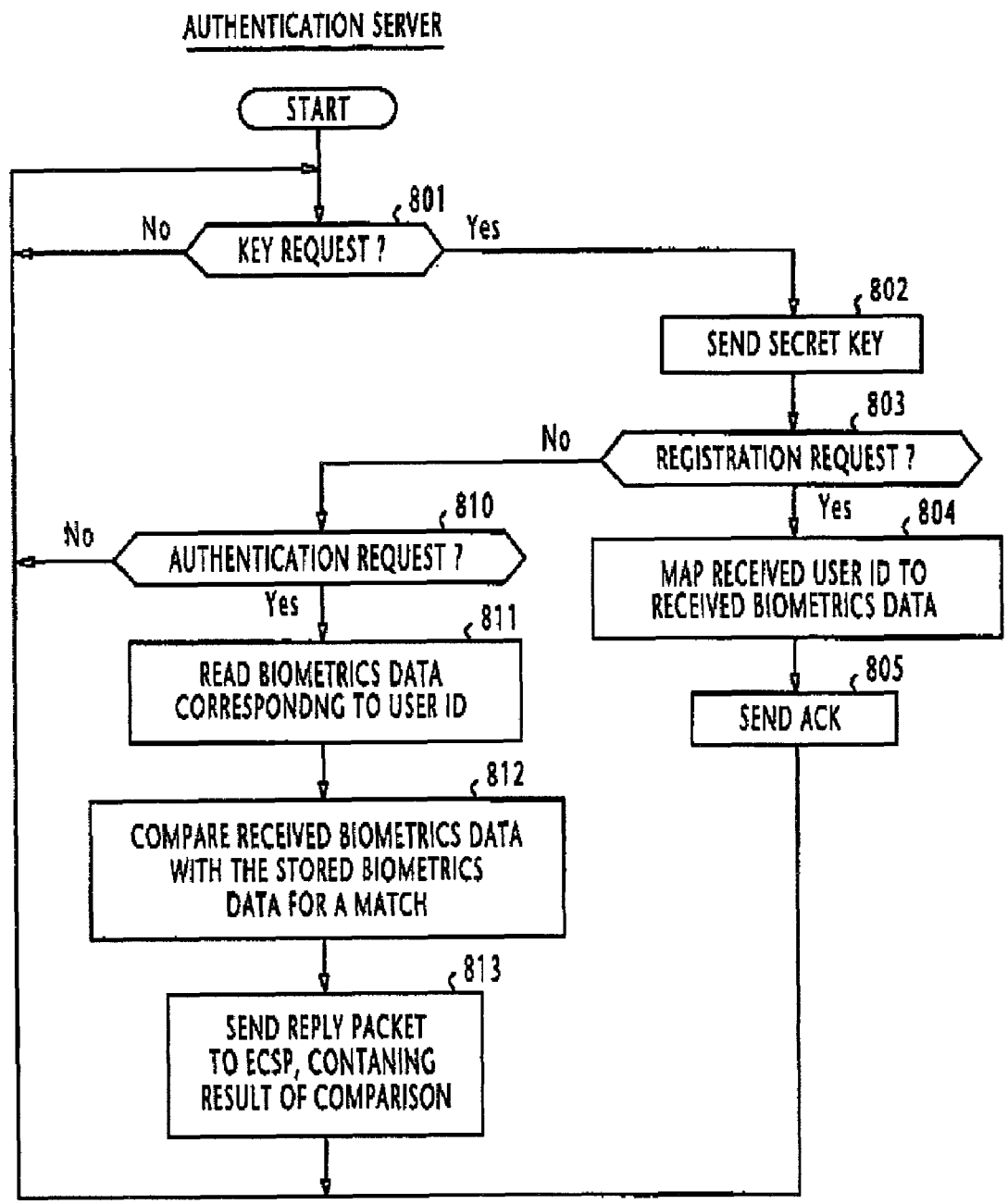
FIG. 8 is a flowchart of a first mode of operation of the authentication server of FIG. 6.
Figure 10:
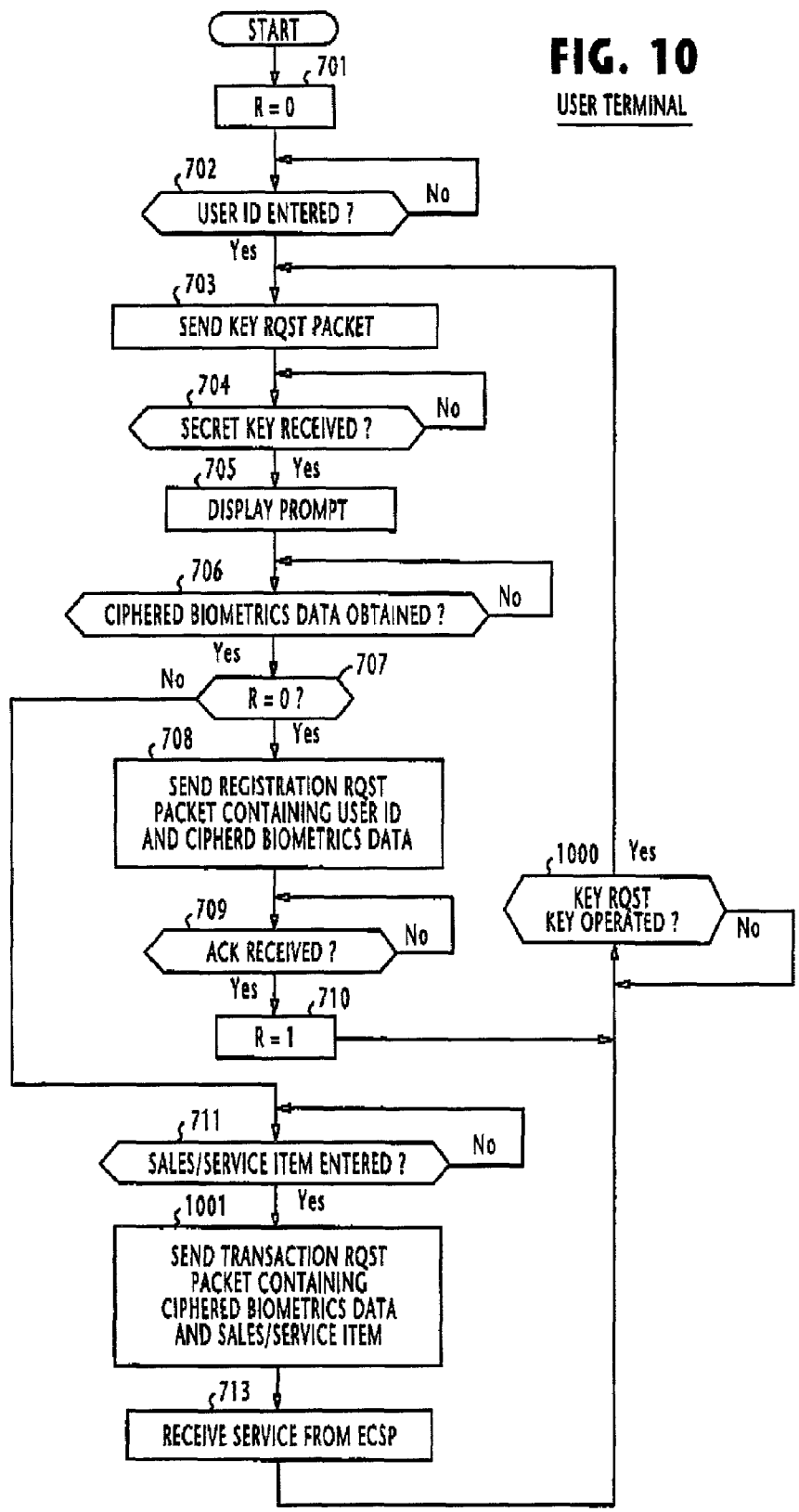
FIG. 10 is a flowchart of a second mode of operation of the user terminal of FIG. 6.
Figure 11:
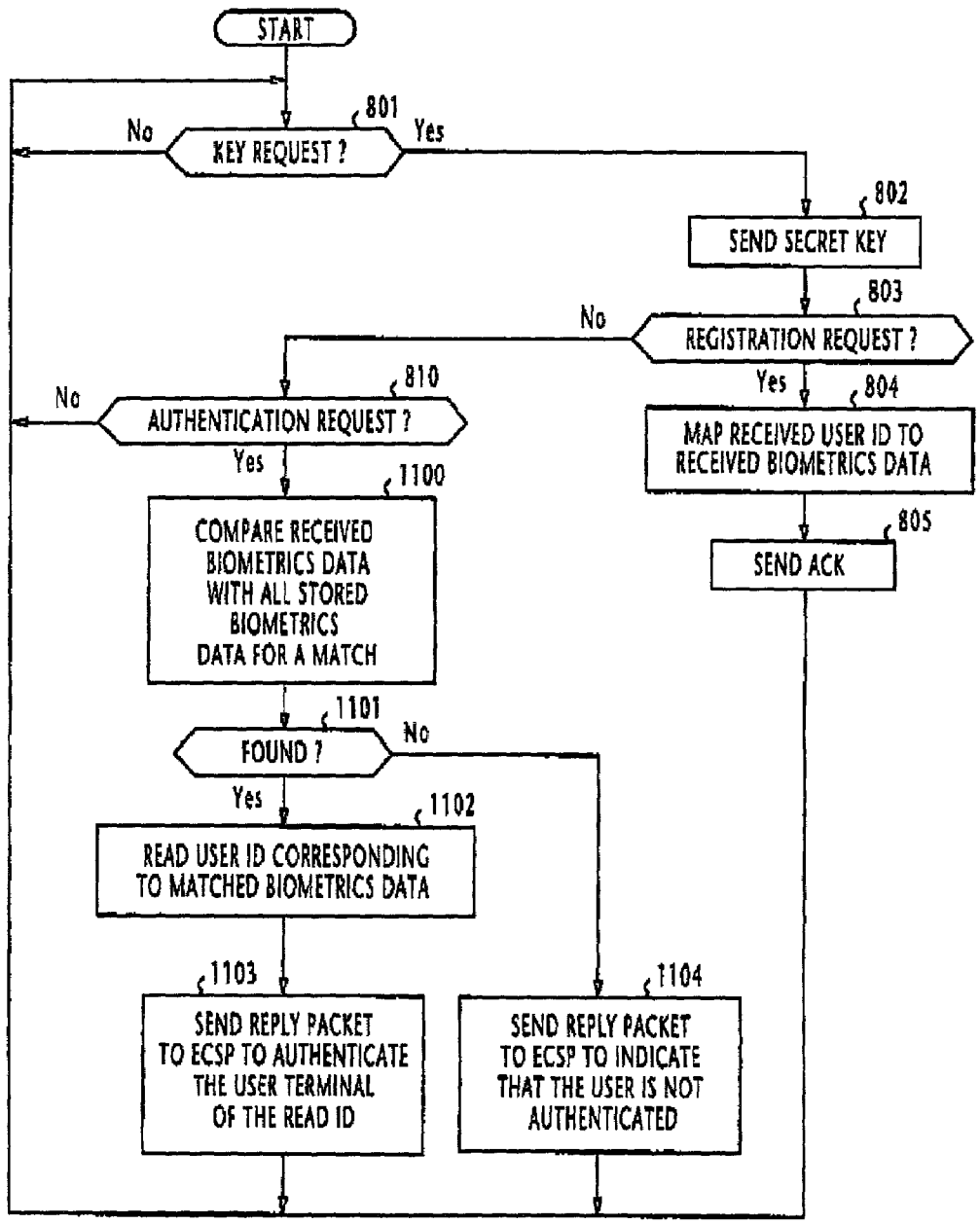
FIG. 11 is a flowchart of the second mode of operation of the authentication server of FIG. 6.

The system of FIG. 6 operates in one of two modes. In the first mode which is shown in the flowcharts of FIGS. 7 and 8 and the sequence diagram of FIG. 9, the user is required to enter his own user identifier for each transaction as well as his fingerprint. In the second mode which is shown in the flowcharts of FIGS. 10 and 11 and the sequence diagram of FIG. 12, the user is only required to enter his fingerprint for authentication, relieving the user from the trouble of operating the keypad for entering an identification code.

Figure 9:
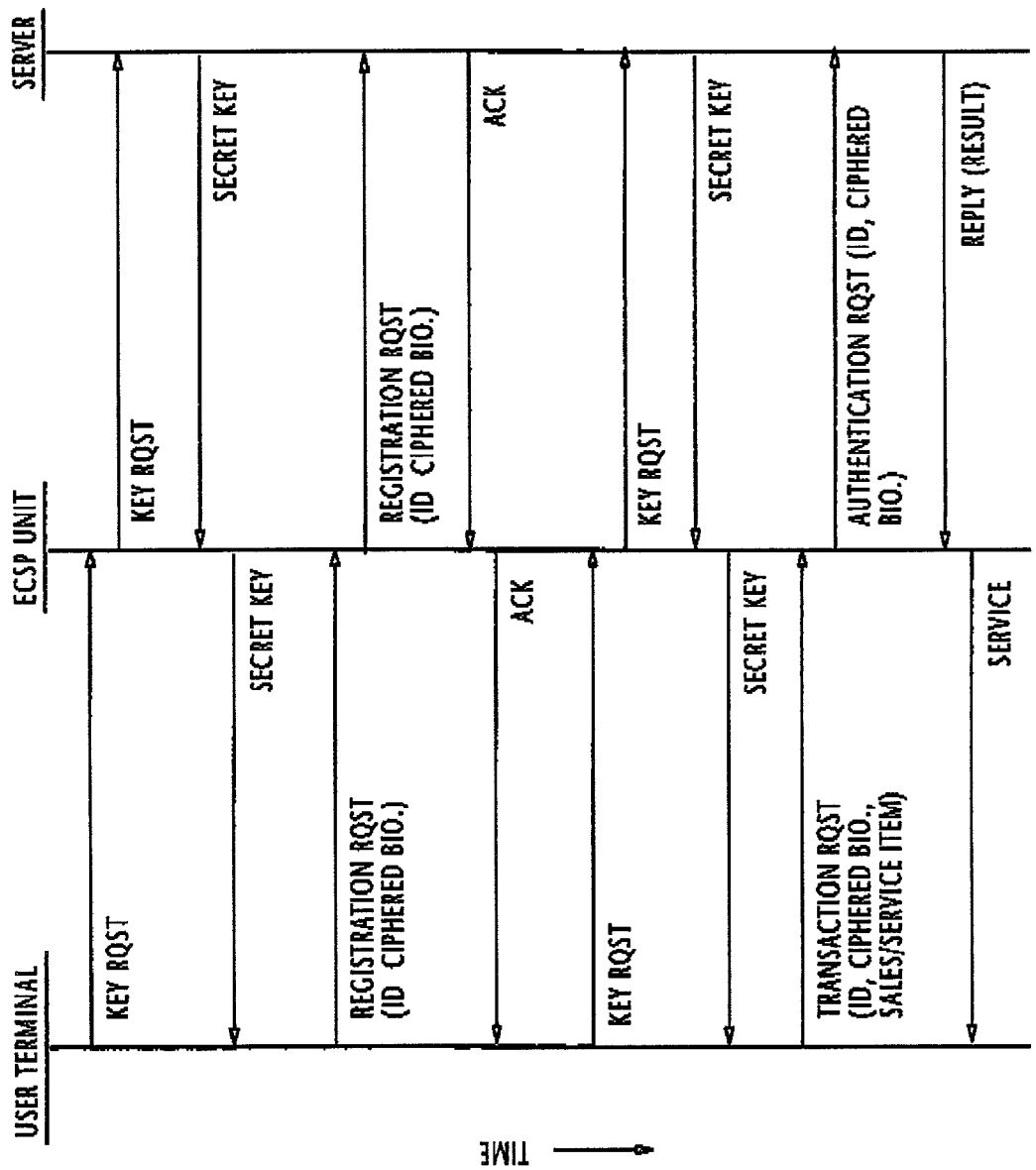
FIG. 9 is a sequence diagram of the first mode of operation of the system of FIG. 6.

In the first mode of operation, the processor 17A at the user terminal 10A proceeds according to the flowchart of FIG. 7 and the sequence diagram of FIG. 9.

At the start of the programmed routine, the processor 17A sets a registration flag R to 0 at step 701 and proceeds to step 702 to monitor the keypad 15A to determine if the user ID is entered. If so, the processor 17A sends a key request packet to a desired ECSP unit 30A (see also FIG. 9). When the processor 17A receives a secret key from the network 20 (step 703), it supplies the secret key to the encryption unit 13A and displays a prompt on the display panel 16A to urge the user to place his finger on the fingerprint sensor 11A. When the user responds to this prompt by putting his finger on the sensor 11A, a fingerprint feature of the sensed fingerprint is extracted by the feature extraction unit 12A and encrypted by the encryption unit 13A using the received secret key to produce ciphered biometrics data of the user. When the ciphered biometrics data is obtained (step 706), the processor 17A checks the flag R to see if the user is already registered or not (step 707). If R=0, the processor 17A determines that the user is not yet registered in the identification system and proceeds to step 708 to transmit a registration request packet to the desired ECSP unit 30A, containing the entered user ID and the ciphered biometrics data. If the registration is successful at the authentication server 40A, an acknowledgment packet will be returned and the processor 17A receives it at step 709 and sets the registration flag R to 1 (step 710), and returns to step 702.

When the user subsequently enters his ID for a transaction, the processor 17A requests an encryption key from the network to produce a ciphered fingerprint feature and determines, at step 707, that the user's ID has already been registered. As a result, the processor 17A proceeds from step 707 to step 711 to check to see if sales/service item of electronic commerce is entered through the keypad 15A. If such an item has been entered, the processor 17A formulates a transaction request packet with the user ID, the ciphered biometrics data and the sales/service item and transmits the packet to the desired ECSP unit In response to the transaction request packet, the ECSP unit formulates and transmits an authentication request packet to the authentication server 40A. If the user is authenticated, the ECSP unit is notified accordingly from the SAU 40A and the user receives appropriate service from the ECSP (step 713), and the processor return to step 702.

In the first mode of operation, the processor 42A at the authentication server 40A proceeds according to the flowchart of FIG. 8 and the sequence diagram of FIG. 9.

When a key request packet is received from the ECSP unit 30A (step 801), the processor 42A transmits an encryption key currently produced by the secret key generator 44A to the ECSP unit, where it is passed on to the requesting user terminal 10A. At step 803, the processor 42A receives a registration request packet containing the ID and ciphered biometrics data of the user and proceeds to step 804 to cause the decryption unit 43A to decipher the received biometrics data and maps the user ID and the deciphered biometrics data in the user identification table 45A. At step 805, the processor 42A sends an acknowledgment packet to the requesting ECSP unit.

If the decision at step 803 is negative, flow proceeds to step 810 to check for the reception of an authentication request packet from the ECSP unit. If an authentication request packet containing the ID and ciphered biometrics data of the user is received, the processor 42A proceeds from step 810 to step 811 to read stored biometrics data from the user identification table 45A corresponding to he received user ID and compares the biometrics data contained in the packet with the biometrics data read from the user identification table 45A to detect a match (step 812). At step 813, a reply packet is sent from the processor 42A to the ECSP unit for indicating the result of the comparison.

Figure 12:
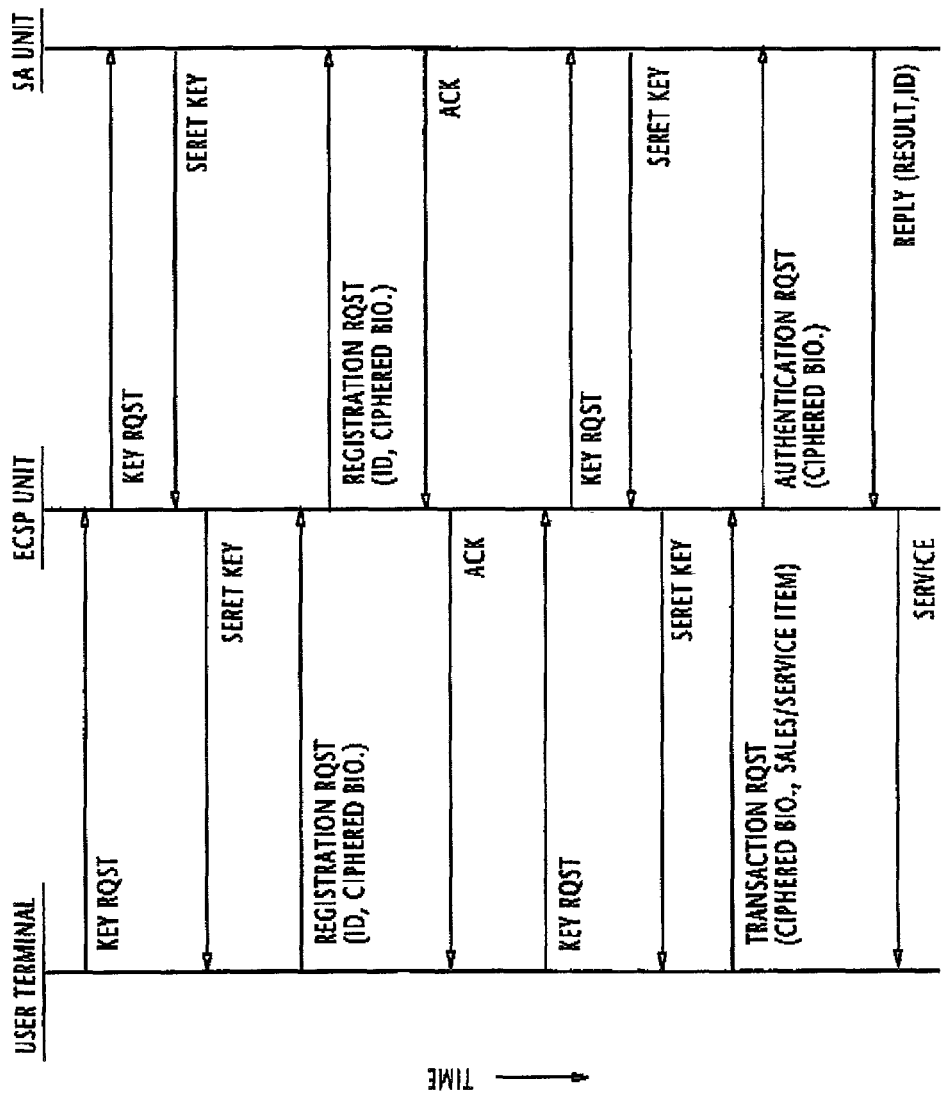
FIG. 12 is a sequence diagram of the second mode of operation of the system of FIG. 6.

In the second mode of operation, the processor 17A at the user terminal 10A proceeds according to the flowchart of FIG. 10 and the sequence diagram of FIG. 12. The flowchart of FIG. 10 differs from that of FIG. 7 in that step 1000 is provided in the return path from steps 710 and 713 to step 703 and step 712 of FIG. 7 is replaced with step 1001.

After the user's ID has been registered in the system, the processor 42A checks to see if a key specified for requesting a secret key is operated before a transaction begins (step 1000). If so, flow returns to step 703 to transmit a key request packet to the desired ECSP unit 30A for ciphering the user's biometrics data. When the decision at step 707 subsequently yields a negative answer, flow proceeds to step 711 to check for the entry of a sales/service item. After a sales/service item is entered, the processor 17A sends a transaction request packet to the ECSP unit, containing the ciphered biometrics data and sales/service item of the user (step 1001). In response, the ECSP unit sends an authentication request packet to the SAU 40A, containing the ciphered biometrics data of the user and waits for a reply packet. It is seen that in the second mode of operation of FIG. 6 the user's ID is not entered by the user and therefore the SAU 40A is only supplied with the user's biometrics data.

In the second mode of operation, the processor 42A at the authentication server 40A proceeds according to the flowchart of FIG. 11 and the sequence diagram of FIG. 12. The flowchart of FIG. 11 is similar to that of FIG. 8 except that steps 811 to 813 of FIG. 8 are replaced with steps 1100 to 1104.

When an authentication request packet is received from the ECSP unit 30A (step 810), the processor 42A causes the decryption unit 43A to decipher the ciphered biometrics data contained in the packet and compares the deciphered biometrics data with all the biometrics data stored in the user identification table 45A for a match (step 1100). If biometrics data corresponding to the received biometrics data is found in the user identification table 45 (step 1101), the processor 42A reads a user ID from the table 45 that corresponds to the matched biometrics data (step 1102). At step 1103, the processor 42A transmits a reply packet to the requesting ECSP unit 30A to indicate that the user terminal identified by the corresponding ID is authenticated. In response to this reply packet, the ECSP proceeds to provide requested electronic commerce service to the identified user terminal.

If no match is detected at step 1101, flow proceeds to step 1104 to send a reply packet indicating that the requesting user is not authenticated and the ECSP unit replies the requesting user with a service denial message.

Figure 13:
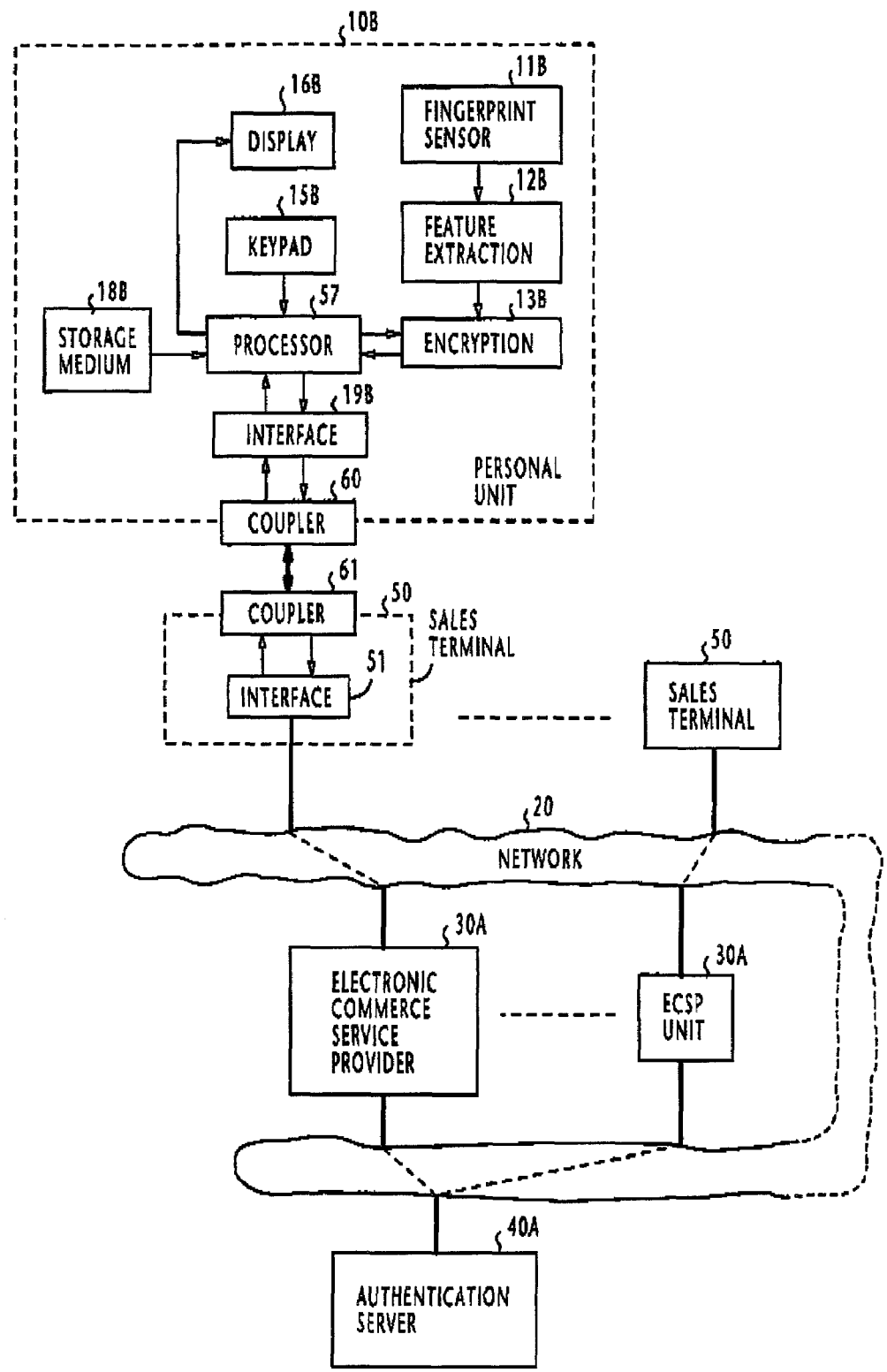
FIG. 13 is a block diagram of a modification of the system of FIG. 6.

In a hardware aspect, the identification system of FIG. 6 can be modified as shown in FIG. 13. In this modification, the users carry a hand-held personal unit 10B such as a mobile cellular telephone or a personal digital assistant (PDA), configured substantially the same way as the user terminal 10A used in the previous embodiment. A plurality of sales terminals 50 are provided in the system. These sales terminals are may be located in sales shops or supermarket stores. The user's personal unit 10B and the sales terminal 50 are provided with couplers 60 and 61, respectively, to establish a connection with each other by using a cable, a wireless link or an infra-red light beam. Sales terminal 50 is comprised of an interface 51 connected to the coupler 61 and the network 20 to operate transparently as an intermediary between the personal unit 10B and the ECSP unit 30A. In this modified system, the personal unit 10B operates in the same way as the user terminal 10A as described in connection with FIGS. 7, 8 and 9.

What is claimed is:

1. An identification system comprising:
a plurality of end terminals,
a plurality of electronic commerce service provider (ECSP) units, wherein each one of the plurality of ECSP units receives a transaction request message containing ciphered biometrics data of a user and a user identifier of said user transmitted from the plurality of end terminals via a communications network and for each received transaction request message, one of the plurality of ECSP units transmits an authentication request message containing said ciphered biometrics data and said user identifier to said network; and
an authentication server comprising a database for mapping a plurality of registered biometrics data to a plurality of corresponding registered user identifiers, wherein the authentication server receives the authentication request messages from the plurality ECSP units via said network, and for each of the received authentication request messages, the authentication server decipheres the ciphered biometrics data and compares the deciphered biometrics data to one of the registered biometrics data which is mapped in said database to the user identifier contained in the received authentication request message and returns a reply to the plurality of ECSP units via said network indicating that said transaction request message is authenticated if the received biometrics data coincides with said mapped biometrics data.

2. The identification system of claim 1, wherein each one of the plurality of ECSP units includes a conversion table for mapping a first plurality of user identifiers to a second plurality of user identifiers, wherein said first plurality of user identifiers are used by said plurality of end terminals and said second plurality of user identifiers are the user identifiers registered in said database, each one of the plurality of ECSP units converts the user identifier contained in the received transaction request message to one of the second plurality of user identifiers which is mapped to the received user identifier and transmits said authentication request message containing the converted user identifier.

3. The identification system of claim 1, wherein each of said end terminals comprises a user terminal exclusively owned by said user.

4. The identification system of claim 1, wherein each of said end terminals comprises a sales terminal to which a plurality of user's handheld personal units can be connected, wherein said sales terminal transparently transmits a transaction request messaged received from each of the personal units to said plurality of ECSP units.

5. The identification system of claim 1, wherein said biometrics data of said user is a fingerprint of said user.

6. The identification system of claim 1, wherein said biometrics data of said user is an extracted feature of a fingerprint of said user.

7. The identification system of claim 1, wherein each of said end terminals is configured to generate said ciphered biometrics data with a secret key generated by a variable secret key generator which generates secret keys which vary with time, the generated secret key being agreed-upon with said authentication server.

8. The identification system of claim 7, wherein said variable secret key generator is located at said authentication server and wherein each of said end terminals is configured to transmit a key request message to said authentication server via said plurality of ECSP units, to receive said secret key from the secret key generator: and to ciphering a biometrics data with the received secret key before said transaction request message is transmitted.

9. The identification system of claim 8, wherein said authentication server comprises a variable secret key generator which generates a secret key which varies with time, and a decryption unit for deciphering the received ciphered biometrics data by using the secret key generated by said secret key generator.

10. An identification system comprising:
   a plurality of end terminals
   a plurality of electronic commerce service provider (ECSP) units, wherein each one of the plurality of ECSP units receives a transaction request message containing ciphered biometrics data of a user and a user identifier of said user transmitted from the plurality of end terminals via a communications network and for each received transaction request message, one of the plurality of ECSP units transmits an authentication request message containing said ciphered biometrics data to said network: and
   an authentication server comprising a database for mapping a plurality of registered biometrics data to a plurality of corresponding registered user identifiers, wherein the authentication server receives the authentication request messages from the plurality of ECSP units via said network, comparing and for each of the received authentication request messages, the authentication server deciphers the ciphered biometrics data and compares the deciphered biometrics data to all of the registered biometrics data in said database, detects the user identifier mapped to the registered biometrics data which coincides with the deciphered biometrics data, and returns a reply to the plurality of ECSP units via said network indicating that a user identified by the detected user identifier is authenticated.

11. The identification system of claim 10, wherein each of said end terminals comprises a user terminal exclusively owned by said user.

12. The identification system of claim 10, wherein each of said end terminals comprises a sales terminal to which a plurality of user's handheld personal units can be connected, wherein said sales terminal transparently transmits a transaction request messaged received from each of the personal units to said plurality of ECSP units.

13. The identification system of claim 10, wherein said biometrics data of said user is a fingerprint of said user.

14. The identification system of claim 10, wherein said biometrics data of said user is an extracted feature of a fingerprint of said user.

15. The identification system of claim 10, wherein each of said end terminals is configured to generate said ciphered biometrics data with a secret key generated by a variable secret key generator which generates secret keys which vary with time, the generated secret key being agreed-upon with said authentication server.

16. The identification system of claim 15, wherein said variable secret key generator is located at said authentication server and wherein each of said end terminals is configured to transmit a key request message to said authentication server via said plurality of ECSP units to receive said secret key from the secret key generator: and to cipher a biometrics data with the received secret key before said transaction request message is transmitted.

17. The identification system of claim 16, wherein said authentication server comprises a variable secret key generator which generates a secret key which varies with time, and a decryption unit for deciphering the received ciphered biometrics data by using the secret key generated by said variable secret key generator.

18. An identification method comprising the steps of:
   a) transmitting, from a plurality of end terminals, transaction request messages, containing ciphered biometrics data of a user to a communications network;
   b) receiving, at each one of a plurality of electronic commerce service providers, one of the transaction request messages via said network;
   c) for each received transaction request message, transmitting, an authentication request message containing said ciphered biometrics data from one of the plurality of electronic commerce service provider units to said network;
   d) receiving said authentication request messages via said network at a user authenticator having a database for storing a plurality of registered biometrics data and the ciphered biometrics data contained in the received authentication request messages;
   e) for each of the received authentication request messages, determining whether the deciphered biometrics data has corresponding biometrics data in said database; and
   f) for each of the received authentication request messages, returning a reply from said user authenticator to said plurality of electronic commerce service provider via said network indicating that said transaction request message is authenticated if the received deciphered biometrics data coincides with one of the registered biometrics data of the database.

19. An identification method comprising the steps of:
   a) transmitting, from a plurality of end terminals, transaction request messages, each transaction request message containing ciphered biometrics data of a user and a user identifier of said user to a communications network;
   b) receiving, at each one of a plurality of electronic commerce service providers, one of said transaction request messages via said network;
   c) for each of the received transaction request messages, transmitting, an authentication request message containing said ciphered biometrics data and said user identifier from one of the plurality of electronic commerce service provider units to said network;
   d) receiving said authentication request messages at a user authenticator via said network, the authenticator having a database in which a plurality of registered biometrics data are mapped to a plurality of corresponding registered user identifiers and deciphering the ciphered biometrics data contained in the received authentication request messages;

e) for each of the received authentication request messages, comparing the deciphered biometrics data to one of the registered biometrics data which is mapped in said database to the user identifier contained in said authentication request message; and f) for each of the received authentication request messages, returning, from the user authenticator, a reply to said plurality of electronic commerce service providers via said network indicating that said transaction request message is authenticated if the received biometrics data coincides with said mapped biometrics data.

20. The identification method of claim 19, wherein the user identifiers stored in said database are different from the user identifiers of said end terminals, further comprising converting, at each one of the plurality of electronic commerce service providers, the user identifier contained in the received transaction request message to a second user identifier which is contained in said authentication request message as the first-mentioned user identifier.

21. The identification method of claim 19, wherein a biometrics data contained in the transaction request message is ciphered by using a secret key which varies with time and agrees with the secret key with which the ciphered biometrics data is deciphered at said user authenticator.

22. An identification method comprising the steps of:
a) transmitting, from a plurality of end terminals, transaction request messages, each transaction request message containing ciphered biometrics data of a user to a communications network;
b) receiving, at each one of a plurality of electronic commerce service providers, one of said transaction request message via said network;
c) for each of the received transaction request messages, transmitting, an authentication request message containing said ciphered biometrics data from one of the plurality of electronic commerce service providers to said network;
d) receiving, at a user authenticator having a database in which a plurality of registered biometrics data are mapped to a plurality of corresponding registered user identifiers, said authentication request messages via said network and deciphering the ciphered biometrics data contained in the received authentication request messages;
e) for each of the received authentication request messages, comparing the deciphered biometrics data to all of the registered biometrics data in said database to detect coincidence;
f) for each of the received authentication request messages, detecting the user identifier mapped to the biometrics data which coincides with the deciphered biometrics data; and
g) for each of the received authentication request messages, returning a reply from the user authenticator to said plurality of electronic commerce service providers via said network indicating that said user having the detected user identifier is authenticated.

23. An identification system comprising:
a plurality of terminals,
a plurality of electronic commerce service provider (ECSP) units, wherein each one of the plurality of ECSP units receives a registration request message containing ciphered biometrics data of a user and a user identifier of said user transmitted from the plurality of end terminals via a communications network, retransmits the registration request message to said network, receives a transaction request message containing said ciphered biometric data and user identifier transmitted from the plurality of end terminals via said network, and for each received transaction request message, transmits an authentication request message containing said biometrics data and said user identifier to said network; and
an authentication server for receiving said registration request messages from said plurality of ECSP units via said network, mapping in a database a plurality of biometric data contained in a plurality of said registration request messages to a plurality of corresponding user identifiers contain in said registration request messages, the authentication server further receiving the authentication request messages from the plurality of ECSP units via said network, and for each of the received authentication request messages, the authentication server deciphers the ciphered biometrics data and compares, the received deciphered biometrics data to one of the biometrics data which is mapped in said database to the user identifier contained in the received authentication request message and returns a reply to said the plurality of ECSP units via said network indicating that said transaction request message is authenticated if the received biometrics data coincides with said mapped biometrics data.

24. An identification system comprising:
a plurality of end terminals,
a plurality of electronic commerce service provider (ECSP) units, wherein each one of the plurality of ECSP units receives a registration request message containing ciphered biometrics data of a user and a user identifier of said user transmitted from the plurality of end terminals via a communications network, retransmits the registration request message to said network, receives a transaction request message containing said ciphered biometrics data transmitted from the plurality of end terminals via said network, and for each received transaction request message, transmits an authentication request message containing said ciphered biometrics data and said user identifier to said network; and
an authentication server for receiving said registration request messages from said plurality of ECSP units via said network, mapping a plurality of biometrics data contained in a plurality of said registration request messages to a plurality of corresponding user identifiers contained in said registration request messages, the authentication server receiving the authentication request messages from the plurality of ECSP units via said network, and for each of the received authentication request messages, the authentication server decipheres the ciphered biometrics data and compares comparing the received and deciphered biometrics data to all of the biometrics data in said database, detects the user identifier mapped to the biometrics data which coincides with the received biometrics data, and r4mmain~returns a reply to said plurality of ECSP units via said network indicating that a user identified by the detected user identifier is authenticated.

25. An authentication server comprising:
a database for mapping a plurality of registered biometrics data to a plurality of corresponding registered user identifiers;

an interface unit for receiving authentication request messages from a plurality of electronic commerce service provider (ECSP) units via a network, each authentication request message containing ciphered biometrics data of a user and a user identifier of said user;

a deciphering unit which deciphers the ciphered biometrics data; and a processor, wherein for each of the received authentication request messages, the processor compares the deciphered biometrics data to one of the registered biometrics data which is mapped in said database to the user identifier contained in the received authentication request message, wherein the interface unit returns a reply to the plurality of ECSP units via said network indicating that the transaction request message is authenticated if the deciphered biometrics data coincides with the said mapped biometrics data, wherein each authentication request message corresponds to a transaction request message transmitted to one of the plurality of ECSP units from one of a plurality of user terminals via said network.

26. An authentication server comprising:

a database for mapping a plurality of registered biometrics data to a plurality of corresponding registered user identifiers;

an interface unit for receiving authentication request messages from a plurality of electronic commerce service provider (ECSP) units via a network, each authentication request message containing ciphered biometrics data of a user and a user identifier of said user;

a deciphering unit which deciphers the ciphered biometrics data; and a processor, wherein for each of the received authentication request messages, the processor compares the deciphered biometrics data to all of the registered biometrics data in said database and detects the user identifier mapped to the biometrics data which coincides with the deciphered biometrics data, wherein the interface unit returns a reply to the plurality of ECSP units via said network indicating that a user identified by the detected user identifier is authenticated, wherein each authentication request message corresponds to a transaction request message transmitted to one of the plurality of ECSP units from one of a plurality of user terminals via said network.

* * * * *